(No Model.)
J. C. THOMPSON.
GRUBBING HOE.
No. 509,264.  Patented Nov. 21, 1893.
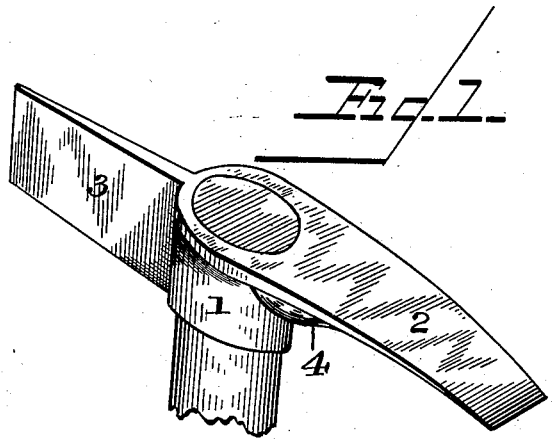
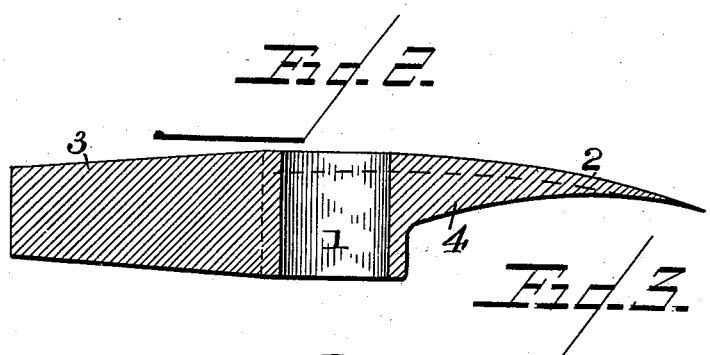
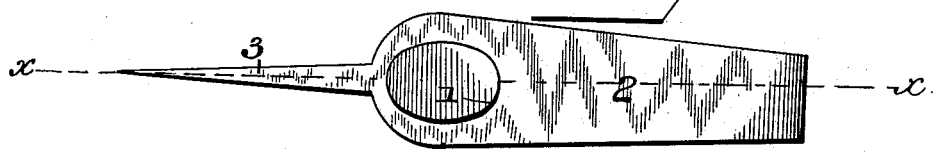
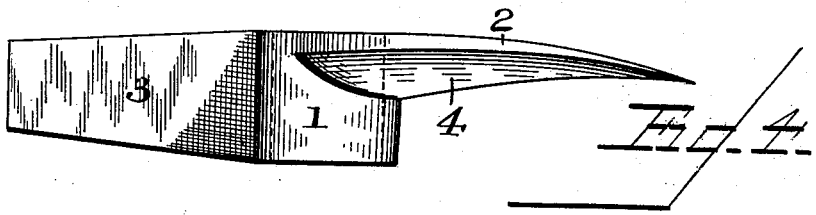
WITNESSES:
F. L. Ourand
J. L. Coombs
INVENTOR:
James C. Thompson
by Louis Bagger & Co.
Attorneys

UNITED STATES PATENT OFFICE.

JAMES C. THOMPSON, OF FAIRFAX COURT-HOUSE, VIRGINIA.

GRUBBING-HOE.

SPECIFICATION forming part of Letters Patent No. 509,264, dated November 21, 1893.

Application filed February 6, 1893. Serial No. 461,201. (No model.)

*To all whom it may concern:*

Be it known that I, JAMES C. THOMPSON, a citizen of the United States, and a resident of Fairfax Court-House, in the county of Fairfax and State of Virginia, have invented certain new and useful Improvements in Grubbing-Hoes; and I do hereby declare that the following is a full, clear, and exact description of the invention, which will enable others skilled in the art to which it appertains to make and use the same, reference being had to the accompanying drawings, which form a part of this specification.

My invention relates to improvements in grubbing hoes, the object being to provide a novel implement of this character which shall possess superior advantages with respect to utility and efficiency in use.

The invention consists in the novel construction, hereinafter fully described and claimed.

In the accompanying drawings: Figure 1 is a perspective view of a hoe constructed in accordance with my invention. Fig. 2 is a section on the line, $x$—$x$, Fig. 3. Fig. 3 is a plan view. Fig. 4 is a side view.

In the said drawings, the reference numeral 1 designates the boss or hub having an eye or aperture to receive an ordinary helve, and provided with a grubbing blade 2, and an ax or cutting blade 3, all formed integral or of a single piece of metal. The grubbing blade is made widest at the hub or boss and tapers inwardly to the end forming a wedge-shaped blade, narrowest at the end or cutting edge. This blade upon its inner side, is formed with a reinforcing rib 4, extending from the boss to near said end, and its edge is formed into a cutting-blade, as seen in Fig. 2. The ax or cutting-blade 3 also tapers inwardly from the hub or boss to the end forming a wedge-shaped blade, the narrowest portion of the same being at the cutting edge.

The old style mattocks or grubbing hoes which are widest at the cutting edges of both the hoe and ax ends, are very liable in use to become fastened between roots and various other obstructions, rendering it very difficult to withdraw them, thus rendering the implement very inefficient. By my invention, however, in which the narrowest portions are at the cutting edges, the implement can be readily withdrawn from the soil, as by wriggling the helve slightly, it will readily slip out, while in the old style, the tendency is to work the blade in deeper. The cutting blades of the hoe and the ax, are at a right angle to each other, as seen in the drawings.

Having thus described my invention, what I claim is—

A grubbing hoe or other similar implement, consisting of a boss having an eye to receive a helve, a wedge-shaped grubbing blade narrowest at the cutting edge, the reinforcing rib extending from the boss to near the end of the grubbing blade and formed with a cutting edge, and the wedge-shaped ax or cutting blade, narrowest at the cutting end, substantially as described.

In testimony that I claim the foregoing as my own I have hereunto affixed my signature in presence of two witnesses.

JAMES C. THOMPSON.

Witnesses:
W. T. RAMSEY,
JOHN H. RENNEY.